X-Y RECORDER PLOTTING CIRCUIT

Filed June 30, 1964 3 Sheets-Sheet 1

ROYCE L. CUTLER
INVENTOR.

BY Browning, Simms, Hyer & Eickenroht
ATTORNEYS

X-Y RECORDER PLOTTING CIRCUIT

Filed June 30, 1964

ROYCE L. CUTLER
INVENTOR.
BY Browning, Simms, Hyer & Eickenroht
ATTORNEY

ROYCE L. CUTLER
INVENTOR

BY Browning, Simms, Hyer & Eickenroht

ATTORNEYS

United States Patent Office 3,299,432
Patented Jan. 17, 1967

3,299,432

X–Y RECORDER PLOTTING CIRCUIT

Royce L. Cutler, Bellaire, Tex., assignor to Houston Instruments Corporation, Bellaire, Tex.

Filed June 30, 1964, Ser. No. 379,202
19 Claims. (Cl. 346—29)

This invention relates to a point plot recorder, and to a circuit for controlling same, for point plotting information from a multi-channel source.

The point plotting of data has been a function of X–Y recorders for several years. In such type of plotting, a source of information, such as a pulse height analyzer or a computer of average transients, feeds successive bits of information into the recorder so that this information is plotted point by point. For example, the bits of information may be stored in a computer memory section. This information is fed, bit by bit, to the point plot recorder. Each computer channel contains a voltage level which represents the ordinate of a point to be plotted. Usually the abscissa of each point is obtained from a step generator within the computer. This voltage increases an equal increment for each successive channel to be recorded. Thus, the variable information contained in the memory channel will be plotted across the chart paper as the function of the computer step generator output.

These point plotters employ servomechanisms which respond to error signals to move the pen or other recording mechanism to a proper position on the paper (null position) and then a signal causes the pen to mark a point upon the paper. Of course this should occur only after the pen has been moved to the null position.

Prior to this invention, there have been several methods of identifying the null position or condition, that is, identifying that the information has been received and the pen has arrived at the proper coordinate point. Only one of these methods has found appreciable application. That method is to sense a null condition with a phase sensitive detector somewhere within the servo loop of the recorder.

The prior methods have several disadvantages. They are all limited in sensitivity, are highly susceptible to noise and require fine sensitivity adjustment. For example, the servo loop contains considerable noise of varying amplitude and in many instances the phase detector in the servo loop must be adjusted to pick up signals having an amplitude only slight greater than the noise level in order to obtain a desired sensitivity. As a result, there is a problem of continually having to adjust the sensitivity because of varying noise levels. Also in many of the prior art systems, spurious transient spike signals of relatively large amplitude but of very short duration cause the pin to plot false data. Thus the spikes' amplitude may exceed the threshold level at which the sensitivity is adjusted to exclude background noise and cause the pen to print out while it is moving.

It is accordingly an object of this invention to provide a point plot recorder system and a circuit for controlling the same which has virtually a noise free input thereby substantially eliminating the need for any sensitivity adjustment.

Another object is to provide such a system and circuit which has an improved resolution accuracy of an order matching that of a recorder servo system.

Another object of the invention is to provide such a system and circuit in which the pen or other recording mechanism is prevented from plotting a point during the time the recorder servo system may be adjusting the pen position for overshoot.

Another object is to provide such a system and circuit in which any spurious signals are prevented from actuating the pen or recording mechanism after it has received a bona fide print-out signal.

As indicated above, the various bits of information are fed to the recorder by switching the recorder input from channel to channel of a memory bank. Should a succeeding channel not contain information resulting in sufficient movement of the recorder servomechanism to cause a print-out signal, the recorder will stall and not be advanced to record the other channels.

It is accordingly an object of this invention to provide a recorder and a circuit therefor in which there is generated a pulse for advancing the read-out to another channel and also a force plot pulse which will trigger the circuit to cause the pen to print-out in the absence of the print-out signal normally resulting from receipt of a new bit of information.

Other objects, advantages and features of the invention will be apparent from the specification, claims and the appended drawings, wherein:

Figure 1:
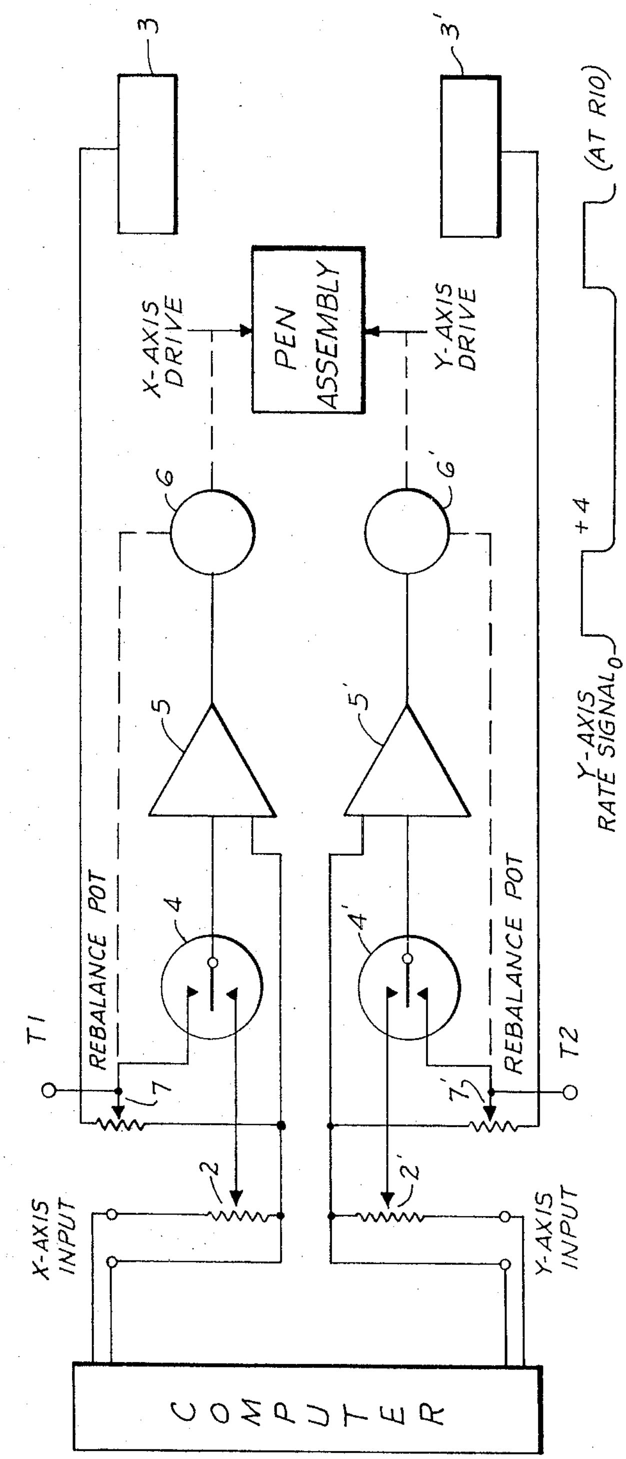
FIG. 1 illustrates an information source, such as a computer, and a servo system for an X–Y recorder.

In the drawings, the two terminals labeled T1 indicate they are to be connected together and the same applies to T2 and T3, respectively.

Referring to the drawings, the computer 1 has bits of information stored in each of its channels of its memory section which bits are to be recorded by the X–Y point plotter. This information plus a stepping voltage for the X axis is fed into a conventional X–Y recorder employing conventional servo-mechanisms for driving a pen or other recording mechanism to a null point. Thus the input voltages are fed to attenuators 2, 2′ and the resulting voltages are compared with reference voltages 3, 3′ by choppers 4, 4′ and servo amplifiers 5, 5′. Any resulting error signal causes servo motors 6, 6′ to drive the wipers 7, 7′ to a null point. Simultaneously the servo motors respectively position the pen along the X and Y axes.

In accordance with this invention, the null condition of the pen is detected by sensing the rate of movement of a record making mechanism along the X and Y axes. Preferably this can be done by sensing the null condition from the rebalance potentiometers, that is, by sensing when the rate of change of voltages on the wipers of the rebalance potentiometers exceeds predetermined magnitudes. Alternatively, separate D.C. potentiometers can be used in the same fashion when their wipers are driven by the servo motors.

Thus, means are provided for sensing the rate of movement of the record making mechanism or pen of the X–Y recorder along each axis. This means also generates a rate signal for each movement along the axis while the rates of movements are above predetermined magnitudes. Thus, as shown in the drawings, the wiper arms of the rebalance potentiometers are used as a source of input signal to the X and Y axes rate generators. Since these potentiometers are of the direct current type, their movement by the servomechanism will cause the voltage on them to change and these voltages are respectively applied to capacitors C1 of the X and Y axis generators. In this connection both the rate generator circuits are shown to be the same and therefore only one of them will be described.

The input capacitor C1 and the input impedance of the rate generator provide a rate network to form the rate pulse for each axis The rate pulse may be either negative or positive and is determined by the direction of movement of the pen along the axis As will be seen, the generator contains several stages of amplifiers and the rate pulse is amplified so that, depending upon its polarity, it will either saturate or cut off the last gain stage of the amplifier Q6. Desirably, the gain is made quite high so that only a limited movement of the axes will provide rise and fall times comparable with rise and fall times of larger excursions On large negative excursions, Q1 and Q2 will be cut off and will prevent C1 from discharging when the axis nulls. Therefore, C1 discharges through Q3 to prevent a long time delay.

Preferably, R8 and R9 are chosen to provide approximately zero volts D.C. at the output between R9 and R10.

Figure 3:
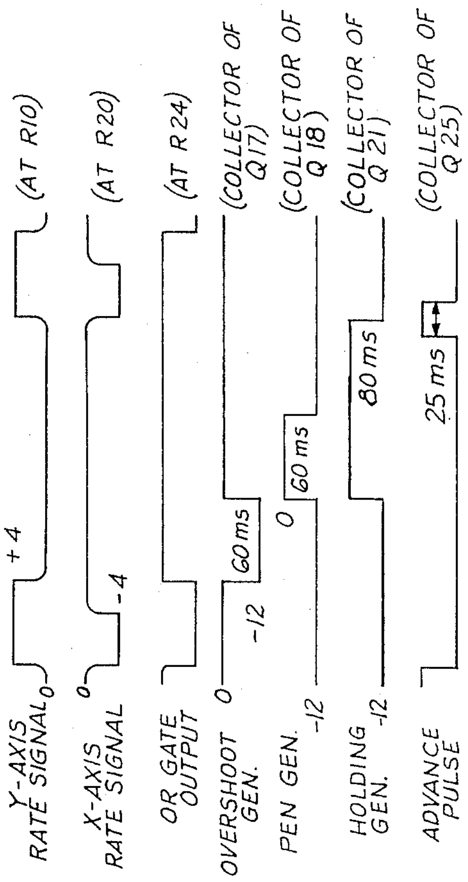
FIG. 3 is a time-sequence chart showing the time relationship of various signals in the control circuit.
Figure 2A:
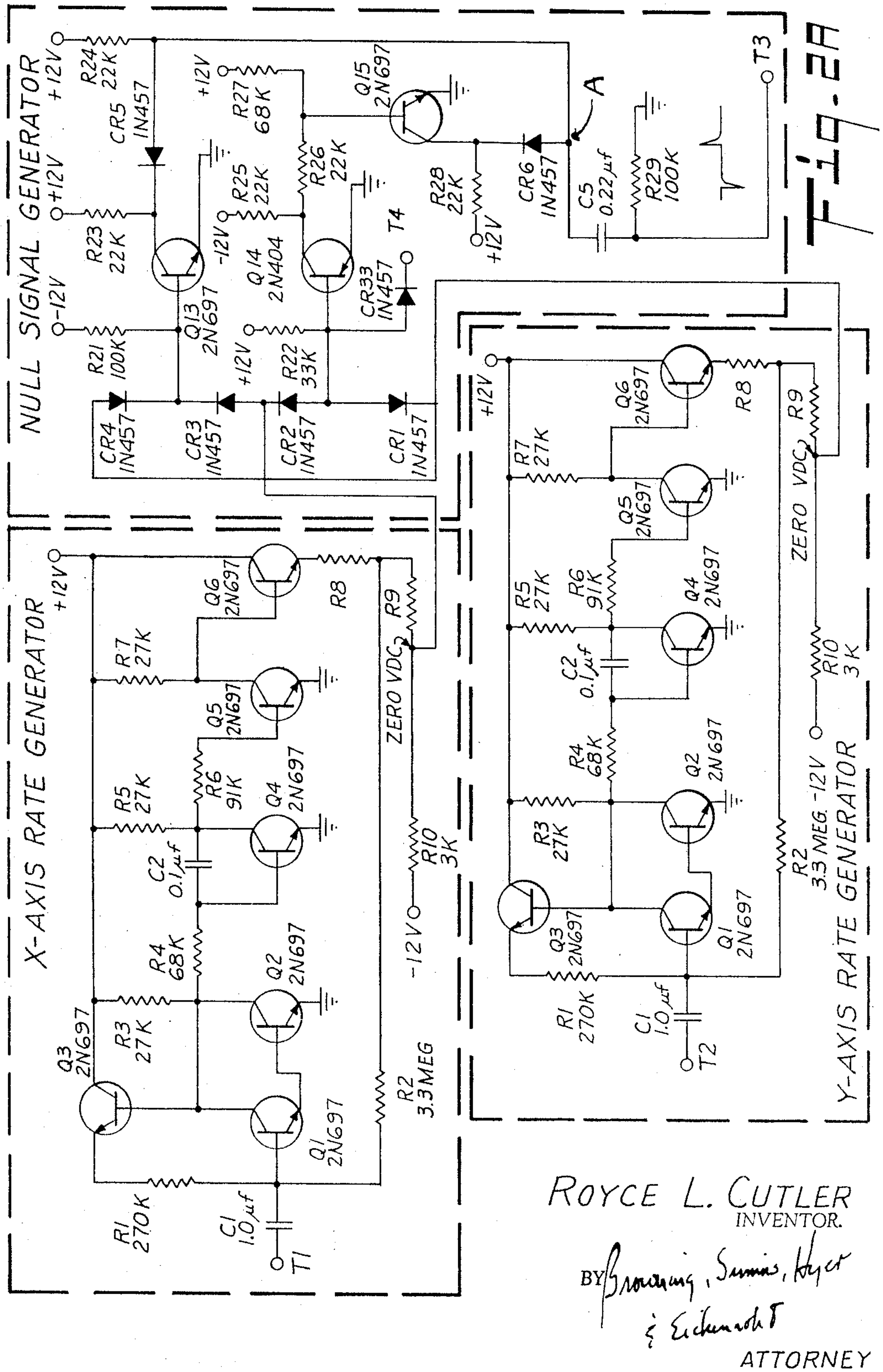
FIGS. 2A and 2B illustrate a preferred embodiment of the control circuit of this invention.
Figure 2B:
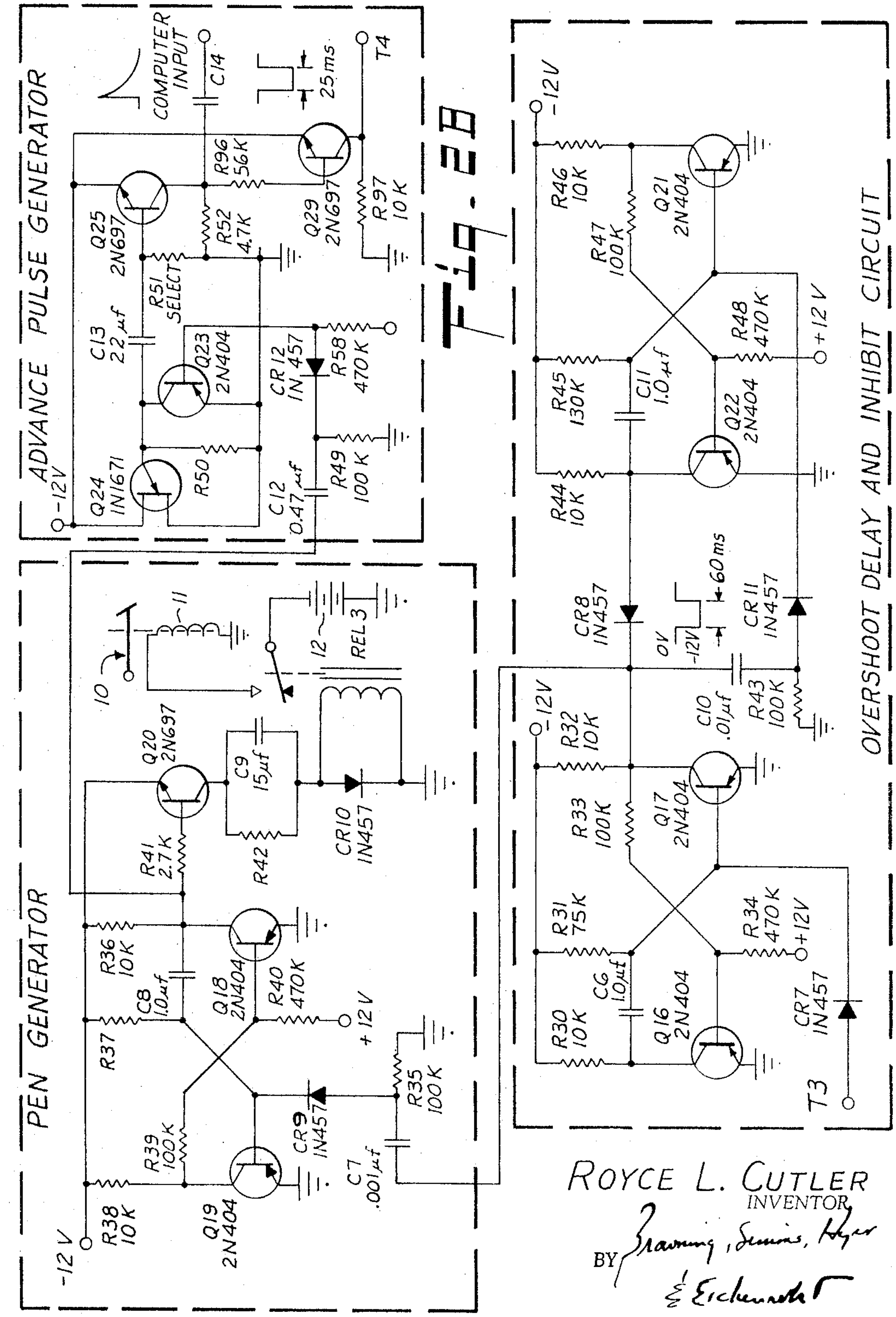

It will thus be seen that the output of each axis rate generator will be a positive or a negative square pulse as determined by the direction of movement along each axis of the recorder. The duration or width of the pulse corresponds to the time for the wiper and pen to be moved from their initial position to a new null position by the servomechanisms and thus the rate signals from the generators have a time duration as long as the rates of movement of the pen along its axes or of wiper arms are above predetermined magnitudes. In FIG. 3, there is illustrated a typical rate signal for both axes for two successive input signals to the rate generators.

A null signal generator is provided to respond to both of the rate signals when both are present, or to only one when only one is present. It generates a null signal when all rate signals applied thereto have ceased thereby indicating that the pen or recording mechanism is at a null point or, at least, has stopped moving in the directions in which it was originally moving. Thus the purpose of this generator is to provide a single null signal when both axes of the recorder reach a null condition. Also, it will provide such a null signal upon a force plot command when no rate signal has been detected, as hereinafter described.

Thus, in the preferred embodiment of the null signal generator, an OR gate is provided to receive the rate signals such that the output of the OR gate remains clamped until the largest rate signal from the X or Y axis has been nulled and both axes have come to a null position. Since the rate signals may be either positive or negative in polarity, and the null signal is to be generated regardless of polarity, both positive and negative OR gates are provided. Thus CR1 and CR2 constitute the negative OR gates and CR3 and CR4 the positive OR gates. Application of a positive rate signal through CR3 or CR4, depending upon whether it is coming from the X or the Y axis, saturates Q13, thereby reducing the potential at point A to ground. Similarly, a negative rate signal applied to CR1 or CR2, depending upon which axis generates it, will saturate Q14 which in turn saturates Q15. This will again cause the potential at point A to be reduced to ground.

If, to plot a given point, one axis moves in the positive direction and the other moves in the negative direction, the positive and negative square pulse outputs of the rate generators will cause the potential at point A to fall to ground. If the axis moving in the negative direction is the first to reach null condition, the negative voltage holding Q14 and Q15 at saturation returns to zero. The resulting cut-off of Q14 and Q15 will not affect the output since Q13 is still saturated and is holding point A near ground. When the axis moving in the positive direction reaches null condition, the positive pulse holding Q13 at saturation returns to zero. Transistor Q13 then cuts off, returning point A to its previous positive potential. This change appears as a positive pulse at the output due to the differentiation caused by C5 and R29. This pulse constitutes the null signal indicating that the pen or recorder mechanism has stopped moving along both axes and is used to cause the pen or recording mechanism to print out.

However, there may be some instances in which there is a slight overshoot in the movement of the pen. In order to give the servomechanisms time to correct for this overshoot before print out, there can be provided an overshoot delay and inhibit circuit. Actually the total of this circuit performs two functions. First, it prevents the pen from printing out during the overshoot correction. Second, it can be used to prevent any spurious signals from reaching the pen generator after it has been triggered by the null signal as will be described below.

Thus, with respect to the overshoot feature, the null signal is fed to an astable one-shot multi-vibrator consisting of Q16 and Q17 and associated components. Transistor Q17 is normally on and turns off upon receipt of the null signal from the null signal generator. When Q17 turns off, Q16 turns on, charging capacitor C6 through resistor R31 and keeping Q17 cut off. The time constant of C6 and R31 can be made such that the multi-vibrator remains in its switched state for time sufficient to permit the servomechanisms to correct the overshoot. This may be of the order of 60 milliseconds. After this time has lapsed, the base of Q17 becomes forward biased and Q17 returns to the on condition. The resultant increase in collector voltage appears as a positive trigger at output of the overshoot delay circuit. It will be noted that this trigger pulse corresponds to a time-delayed null signal received from the null signal generator. This signal is then used to cause the pen or recording mechanism to record a point on the recording medium.

A point plotting pen is shown schematically at 10 to include the pen mechanism and an actuating solenoid 11. It is to be understood that this is a schematic illustration of only a single possible recording mechanism but it will serve the purpose of explaining this invention.

Means are provided for operating a recording mechanism responsive to the receipt of a null signal or, when an overshoot delay is used, to the receipt of the delayed null signal. A preferred form of this means is in the form of a print-out circuit and is shown as a pen generator in the drawings. In this circuit, the trigger pulse received from the overshoot delay circuit is fed to a one-shot multivibrator. Thus, this pulse turns Q19 off. When Q19 turns off, Q18 turns on, charging capacitor C8 through resistor R37 and keeping Q19 cut off. At the same time, the positive voltage at the base of Q20 causes it to conduct heavily. The current is then applied to the coil of REL–3 through a pulser circuit formed by C9 and R42. Capacitor C9 will charge in approximately 20 milliseconds and release the relay. During the time the relay is closed, power is supplied to the pen solenoid 11 from a suitable power supply 12. The time constant of C8 and R37 is such as to permit the recording mechanism to print out after which C8 will discharge sufficiently to allow Q19 to return to the on condition. When Q19 turns on, Q18 turns off. When Q18 turns off, its collector voltage returns to the negative supply voltage and supplies a negative trigger to the advance pulse generator.

In some cases, it may sometimes happen that a spurious pen triggering signal will occur in the circuit ahead of the pen generator such as when the pen is dropped or the advance pulse is fired as hereinafter described. It is possible to eliminate the effect of these pulse signals on the pen generator by supplying an inhibit circuit such as shown in the drawings. This conveniently can be used in conjunction with the overshoot delay portion of the circuit to convert it over all into an overshoot delay and inhibit circuit. As shown, the inhibit circuit comprises a one-shot multivibrator which is triggered by the same signal from the overshoot delay circuit as triggers the pen generator. This trigger cuts Q21 off resulting in Q22 turning on, thus charging capacitor C11 through resistor R45 and keeping Q21 cut off. When Q22 turns on, its collector voltage goes to ground potential thereby holding the collector of Q17 in the overshoot delay circuit at ground potential. As the result, the overshoot delay circuit cannot any longer respond to triggering impulses to its input and thus acts with the one-shot multi-vibrator as an inhibit circuit to prevent further signals from being transmitted to the pen generator. The multi-vibrator time constant is such that after the advance pulse has been fired as described below, C11 will have discharged sufficiently to permit Q21 to turn on again. Transistor Q22 will then return to the cut-off condition and its collector voltage will again rise to −12 volts. The collector Q17 in the overshoot delay circuit will no longer be clamped to ground and the overshoot delay circuit will again respond to input pulses.

Means are also provided for generating a pulse responsive to operation of the recorder mechanism. This pulse, termed an advance pulse, can be fed to a computer or other source of information to cause it to feed a new bit of information to be recorded, that is, the advance pulse indexes a computer or the other source to the next channel of stored information to be interrogated. This means also generates another signal, termed a forced plot signal, which, if a given channel contains no stored information, or if the movement of both axes is less than that required to generate a rate signal such as would trigger the null signal generator, the forced plot signal will cause the recorder mechanism to record a point and the resulting advance pulse signal will automatically index the computer or other source of information to the next channel.

As illustrated in the drawings, the advance pulse generator is triggered by a pulse from the pen generator. This pulse is applied to the base of Q23 which then acts as a shunt around R50 to provide a rapid charge time for C13. When C13 is sufficiently charged to fire Q24, C13 discharges through Q24 and R51 to cut off Q25. When Q25 cuts off, its collector goes from a negative voltage to approximately ground. The resultant positive pulse across the differentiating network C14 and R52 is the advance pulse which indexes the computer or other source of information to the next channel. Simultaneously, the positive charge at the collector of Q25 causes Q29 to cut off and its collector goes negative. When the collector Q29 goes negative, the change in voltage appears as the leading edge of the force plot signal and is used to saturate the OR gate circuitry through didode CR33. Thus, the diode CR33 and its connection to the advance pulse generator constitutes a circuit connecting the advance pulse generator to the null signal generator.

The collector Q29 will remain negative until C13 is sufficiently discharged to allow Q25 to turn to the on condition. The time constant of this circuit is such that the force plot signal will be applied to the null signal generator for a period of time beginning at least as early as when the source should be sending a new bit of information from a channel to the rate generators and continuing until a time when rate signals would normally be applied to the null signal generator. As an example, the time constant can be of the order of 25 milliseconds. After this Q25 will return to the on condition and the negative force plot signal at the collector Q29 will cease. If no rate signal is being detected by either null amplifier, the OR gate circuitry will return to the quiescent state and the pen will again be dropped. If, for some reason, the force plot signal should fail to drop the pen, C13 will charge to the firing potential of Q24 after a reasonable time as, for example, two seconds, and another advance pulse and force plot signal will be generated.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an X–Y point plotter having servomechanisms which drive a record making mechanism along X and Y axes to a null point on each axis, means connected to the drive of each servomechanism for sensing the rate of movement of the record making mechanism along each axis and for generating a rate signal for each such movement while the rates of movement are above predetermined magnitudes and ceasing to generate said rate signal when the rates of movement are below predetermined magnitudes; a null detector circuit responsive to each of said rate signals and generating a null signal upon cessation of generation of each of said rate signals in response to the rates of movement of said record making mechanism being below said predetermined magnitudes; and means responding to said null signal and adapted to cause the record making mechanism to be actuated to record a point.

2. The plotter of claim 1 wherein said servomechanisms drive wiper arms of rebalance potentiometers respectively in proportion to movement of the record making mechanism along said X and Y axes, and wherein said sensing means includes a rate circuit for sensing a rate of change of an electrical quantity impressed upon each of said wiper arms and generates said rate signals while said rates of change exceed said predetermined magnitudes.

3. The plotter of claim 1 wherein there is included an advance pulse generator generating an advance signal adapted to cause a computer or other mechanism to which the point plotter is connected to feed additional information to the plotter after said record making mechanism has recorded said point and also generating a force plot signal during an initial portion of the period during which said additional information would normally be fed to the plotter, and a circuit applying said force plot signal to said null detector circuit to cause it to generate a null signal in the absence of both of said rate signals.

4. In an X–Y point plotter wherein servomechanisms are provided to move a record making mechanism along X and Y axes to plot discrete bits of information received successively from a source responsive to successive advance signals sent to said source; means responsive to the rates of movement of said mechanism along each of said X and Y axes for generating rate signals while said rates of movement exceed predetermined magnitudes; a null detection circuit responsive to both of said rate signals and generating a null signal upon both of said rate signals terminating; a print-out circuit responsive to said null signal for causing said record making mechanism to record a point upon receipt of said null signal; means for generating an advance signal responsive to said print-out circuit causing said record making mechanism to record said point and for generating a force plot signal during at least a portion of the interval following said advance signal during which said rate signals would normally be generated responsive to a different bit of information received from said source; and a circuit transmitting said force plot signal to said null detection circuit to cause it to generate a null signal in the absence of rate signals whereby a point is plotted and another force signal generated to condition the source for sending another bit of information.

5. The plotter of claim 4 in combination with an inhibit circuit between said null detection circuit and said print-out circuit transmitting said null signal and then inhibiting transmitting any further signals to the print-out circuit until a predetermined time after generation of an advance signal whereby spurious signals are prevented from triggering the print-out circuit.

6. The plotter of claim 5 wherein the inhibit circuit includes time delay means for delaying transmission of said null signal to the print-out circuit until any overshoot of the record making mechanism has been corrected.

7. A circuit for controlling an X–Y plotter including a pair of D.C. rebalance potentiometers, one for each of the X and Y axes; a pair of rate circuits respectively connected to the wipers of said potentiometers and generating rate signals while the D.C. potentials on the wipers are changing in excess of a predetermined rate in response to movement of the wiper arm so that the rate signals cease when the movement of the wiper arm falls below a predetermined rate; means for operating a recorder mechanism responsive to a null signal; and a null signal generator connecting said rate circuits and said recorder operating means and generating a null signal responsive to cessation of all rate signals applied thereto so that the resulting null signal will be generated when the wipers reach a null point.

8. The circuit of claim 7 wherein time delay means are connected between said null signal generator and said recorder mechanism operating means to delay said null signal for a time sufficient to permit any overshoot of the point recorder mechanism to be corrected.

9. The circuit of claim 7 in combination with an inhibit circuit triggered by said null signal and isolating said recorder mechanism operating means from said null signal generator for a predetermined time after occurrence of said null signal to thereby prevent spurious signals from actuating said recorder mechanism.

10. The circuit of claim 7 in combination with means generating an advance pulse responsive to operation of said recorder mechanism which pulse is adapted to be fed to a computer or other source of information to cause it to feed a new bit of information to be recorded and also generating a force plot signal, a circuit connecting the last said means to the null signal generator and applying the force plot signal thereto to generate a null signal in the absence of both of said rate signals.

11. In a graphic recorder for sequentially plotting data from a source on a chart wherein a servomechanism drives a record marking mechanism along the Y axis of the chart and means are provided for causing relative movement between the marking mechanism and the chart, means connected to the drive of said servomechanism for sensing the rate of movement of the record making mechanism along the Y axis and for generating a rate signal while the rate of movement along the Y axis is above a predetermined magnitude and ceasing to generate said rate signal when the rate of movement is below a predetermined magnitude; a null detector circuit responsive to said rate signal and generating a null signal upon the rate signal falling below a predetermined value in response to the rate of movement of said marking mechanism being below at least one of said predetermined magnitudes; and means responding to said null signal for actuating the first-mentioned means to cause relative movement between the marking mechanism and said chart.

12. The recorder of claim 11 wherein there is also provided means responsive to said null signal for actuating said record making mechanism to record a point on said chart.

13. The recorder of claim 11 wherein said servomechanism drives a wiper arm of a rebalance potentiometer in proportion to the movement of the record making mechanism along the Y axis, and wherein said sensing means includes a rate circuit for sensing a rate of change in an electrical quantity impressed upon said wiper arm and generates said rate signal while said rate of change exceeds at least one of said predetermined magnitudes.

14. In a graphic recorder for sequentially plotting data from a source on a chart wherein a servomechanism drives a record marking mechanism along the Y axis of the chart and means are provided for causing relative movement between the marking mechanism and the chart along the X axis of the chart, means for sensing the rate of movement of the record marking mechanism along the Y axis and for generating a rate signal while the rate of movement along the Y axis is above a predetermined magnitude and ceasing to generate said rate signal when the rate of movement is below a predetermined magnitude; a null detector circuit responsive to said rate signal and generating a null signal upon the rate signal falling below a predetermined value in response to the rate of movement of said marking mechanism being below at least one of said predetermined magnitudes; and means responding to said null signal for actuating the first-mentioned means to cause said relative movement between the marking mechanism and said chart.

15. In a graphic recorder in claim 14 wherein there is included means generating, responsive to said null signal, (a) an advance signal adapted to cause a multichannel source of data to feed an additional bit of information to the recorder after said record marking mechanism has recorded the last bit of information and (b) a force plot signal during only an initial portion of the period during which said additional bit of information would normally be fed to the recorder, and a circuit applying said force plot signal to said null detector circuit to cause it to generate a null signal in the absence of said rate signal.

16. In a graphic recorder for sequentially plotting data from a multichannel source on a chart wherein a servomechanism drives a record marking mechanism along an axis of the chart; means sensing when said servomechanism is moving from an off null to a null position and providing an off null signal when the servomechanism is off null more than a predetermined amount; means generating, responsive to a null signal, an advance signal for advancing the source to a succeeding channel and a force plot signal; and means responsive to both said off null signal and said force plot signal and generating said null signal upon lapse of said force plot signal in the absence of any off null signal but when both an off null signal and a force plot signal are present, generating the null signal upon lapse of the off null signal.

17. The recorder of claim 16 wherein the last-mentioned means includes a gate which initiates generating of said null signal only when both the off null signal and the force plot signal both indicate a null condition.

18. A circuit for controlling a plotter including a D.C. rebalance potentiometer for the Y axis; a rate circuit connected to the wiper of said potentiometer and generating a rate signal while the D.C. potential on the wiper is changing in excess of a predetermined rate so that the rate signal ceases when the wiper stops moving; means for operating a recorder mechanism responsive to a null signal; and a null signal generator connecting said rate circuit and said recorder operating means and generating a null signal responsive to cessation of said rate signal applied thereto.

19. In a graphic recorder for sequentially plotting analog values from a multichannel source, the combination of: a servomechanism for driving a record marking mechanism along the Y axis of the chart, means sensing when the rate of motion of the marking means is above a predetermined level and providing a null signal for initiating advance to the next channel when said rate of motion returns below said predetermined level; means generating a force plot pulse of predetermined width responsive to the source being advanced to another channel, and means responsive to lapse of said force plot pulse to initiate advance to the next channel in the absence of said null signal.

References Cited by the Examiner

UNITED STATES PATENTS

| | | | |
|---|---|---|---|
| 3,127,678 | 4/1964 | Muldoon | 33—1 |
| 3,178,715 | 4/1965 | Demko | 346—29 |

RICHARD B. WILKINSON, *Primary Examiner.*

JOSEPH W. HARTARY, *Assistant Examiner.*